(12) United States Patent
Fujiwara et al.

(10) Patent No.: US 8,436,503 B2
(45) Date of Patent: May 7, 2013

(54) MOTOR (75) Inventors: Masashi Fujiwara, Nagano (JP); Hide Hara, Nagano (JP)

(73) Assignee: Nidec Sankyo Corporation (JP)

( * ) Notice: Subject to any disclaimer, the term of this patent is extended or adjusted under 35 U.S.C. 154(b) by 359 days.

(21) Appl. No.: 12/863,857

(22) PCT Filed: Jan. 21, 2009

(86) PCT No.: PCT/JP2009/000189
§ 371 (c)(1),
(2), (4) Date: Jul. 21, 2010

(87) PCT Pub. No.: WO2009/093443
PCT Pub. Date: Jul. 30, 2009

(65) Prior Publication Data
US 2010/0295398 A1   Nov. 25, 2010

(30) Foreign Application Priority Data
Jan. 21, 2008   (JP) ................................. 2008-010577

(51) Int. Cl.
*H02K 7/08*   (2006.01)
(52) U.S. Cl.
USPC .......................................................... 310/90
(58) Field of Classification Search .................... 310/90; 384/114, 117, 119, 130
See application file for complete search history.

(56) References Cited

U.S. PATENT DOCUMENTS 3,332,133 A * 7/1967 Rye ............................ 29/888.04
6,296,391 B1 * 10/2001 Hayakawa et al. ........... 384/119

FOREIGN PATENT DOCUMENTS

| JP | 51-158948 | 12/1976 |
| JP | 54-155530 | 10/1979 |
| JP | 55-117452 A | 9/1980 |
| JP | 01-152942 A | 6/1989 |
| JP | 2-127818 | 10/1990 |
| JP | 11-196552 A | 7/1999 |
| JP | 11-332176 A | 11/1999 |
| JP | 2003-324890 A | 11/2003 |

OTHER PUBLICATIONS

International Search Report for Application No. PCT/JP2009/000189 with English translation mailed on Mar. 3, 2009.

* cited by examiner

*Primary Examiner* — Dang Le
(74) *Attorney, Agent, or Firm* — Cantor Colburn LLP (57) ABSTRACT A motor may include a rotation member, a bearing which is fixed to the rotation member, and a support shaft by which the rotation member is rotatably supported through the bearing. The bearing may include a first bearing part, which rotatably supports the rotation member, and a second bearing part which rotatably supports the rotation member by an urging part that is urged on a rotation center side. A first end part of the rotation member may have a third bearing part which rotatably supports the rotation member. The first bearing part may be provided at a second end part of the rotation member, a lubricant filling space filled with a lubricant may be formed between the first bearing part and the third bearing part, and the second bearing part may be disposed within the lubricant filling space.

10 Claims, 6 Drawing Sheets

PRIOR ART

MOTOR

CROSS REFERENCE TO RELATED APPLICATIONS

This is a U.S. national stage of international application No. PCT/JP2009/000189, filed on Jan. 21, 2009. Priority under 35 U.S.C. §119(a) and 35 U.S.C. §365(b) is claimed from Japanese Application No. 2008-010577, filed Jan. 21, 2008, the disclosure of which is also incorporated herein by reference.

FIELD OF THE INVENTION

At least an embodiment of the present invention relates to a motor. More specifically, at least an embodiment relates to a motor which includes a bearing for rotatably supporting a rotor (rotation member) with respect to a support shaft (fixed shaft).

BACKGROUND

Generally, a motor has been known in which a rotor (rotation member) supported by a support shaft (fixed shaft) is rotationally driven by a magnetic field generated from a drive coil which is disposed on an outer peripheral side of the rotor (see, for example, Patent Reference 1).

Figure 6:
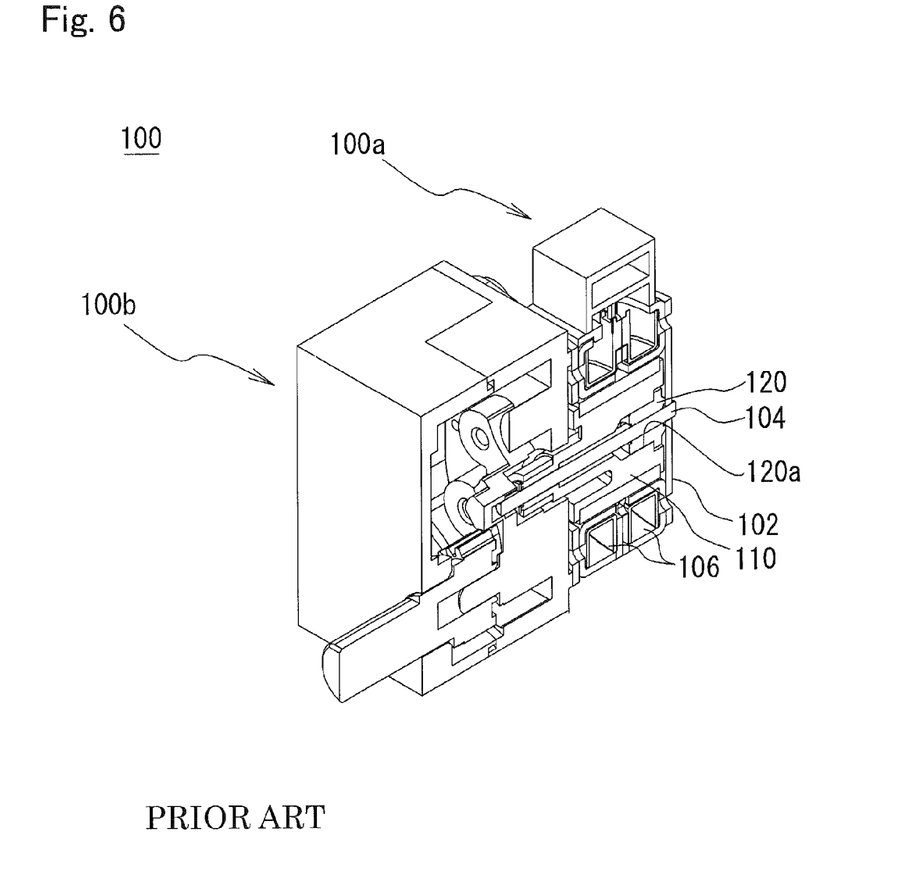
FIG. 6 is an explanatory cross sectional perspective view showing a structure of a conventional motor.

An example of the motor (motor 100) is shown in FIG. 6. The motor 100 is structured of a motor main body part 100a and a gear head 100b. A support shaft 104 is fixed to a motor case 102 in which a drive coil 106 and the like structuring the motor main body part 100a are accommodated. A bearing 120 for improving sliding property with respect to the support shaft 104 is press-fitted and fixed to a rotor 110 which is rotatably supported by the support shaft 104.

[Patent Reference 1] Japanese Patent Laid-Open No. Hei 01-152942.

When the motor 100 is driven, the bearing 120 may expand due to frictional heat caused by sliding between the support shaft 104 and the bearing 120, which may cause that an inner diameter of a bearing hole 120a into which the support shaft 104 is inserted becomes larger.

As a result, a clearance between the support shaft 104 and the bearing hole 120a is increased and thus a noise referred to as a so-called "striking noise" is occurred by means of that the support shaft 104 and the inner peripheral face of the bearing hole 120a are hit with each other.

SUMMARY

In view of the problem described above, at least an embodiment of the present invention provides a motor having excellent calmness in which the "striking noise" occurred between a support shaft for supporting a rotor (rotation member) and a bearing is reduced.

In order to solve the problem, at least an embodiment of the present invention provides a motor including a rotation member, a bearing which is fixed to the rotation member, and a support shaft by which the rotation member is rotatably supported through the bearing. The bearing is structured of a first bearing part, which rotatably supports the rotation member with respect to the support shaft, and a second bearing part which rotatably supports the rotation member with respect to the support shaft by an urging part that is urged on a rotation center side. One end part, i.e., a first end part, of the rotation member is formed with a third bearing part which rotatably supports the rotation member with respect to the support shaft. The first bearing part is provided at the other end part, i.e., a second end part, of the rotation member, a lubricant filling space which is filled with a lubricant is formed between the first bearing part and the third bearing part, and the second bearing part is disposed within the lubricant filling space.

In at least an embodiment, the urging part may be formed at three or more positions in a circumferential direction of the support shaft, and the urging parts are disposed so that all angles between adjacent urging parts around the support shaft are set to be less than 180 degrees.

Further, in at least an embodiment, it is preferable that the support shaft is a rotor shaft for a motor.

In addition, in at least an embodiment, it is further preferable that the support shaft is formed of metal, and the first bearing part and the second bearing part are made of resin and are integrally structured as one body.

Further, in at least an embodiment, it is preferable that the rotation member is urged toward the third bearing part in an axial direction of the support shaft by a spring member.

According to the motor in accordance with at least an embodiment of the present invention, the support shaft is urged in the center direction of the rotation member by the urging part of the second bearing part provided in the rotation member. Therefore, occurrence of striking noise due to rattling between the rotation member (bearing) and the support shaft is prevented.

In this case, the rotation member is rotated while the second bearing part urges the support shaft and thus frictional heat is easily generated between the second bearing part and the support shaft. However, the second bearing part is disposed within the lubricant filling space which is formed by the rotation member and the first bearing part and thus generation of frictional heat is reduced.

Further, the lubricant which is filled in the lubricant filling space is oozed between the bearing surfaces of the first bearing part and the third bearing part provided on the rotation member and the support shaft facing the bearing surfaces and thus frictional resistance between the first bearing part and the third bearing part and the support shaft is reduced.

In addition, according to the motor in accordance with at least an embodiment of the present invention, the support shaft is surely urged in the center direction by a plurality of (three or more) urging parts, which are disposed so that their intervals are set to be less than 180 degrees, against stress occurred in the support shaft in the radial direction.

Further, according to the motor in accordance with at least an embodiment of the present invention, even when the support shaft is a rotor shaft for a motor whose rotational speed is higher, frictional heat generated in the support shaft and abrasion of the support shaft are restrained by the lubricant which is filled in the lubricant filling space.

In addition, according to the motor in accordance with at least an embodiment of the present invention, the support shaft made of metal and the bearing made of resin are slid with each other and thus frictional resistance between them is reduced. Further, the first bearing part and the second bearing part are formed integrally as one body and thus the number of part items is decreased and component manufacturing cost and assembling cost are reduced.

Further, according to the motor in accordance with at least an embodiment of the present invention, when the motor is driven, the rotation member is rotated while the third bearing part and the motor case are slid with each other. In other words, the third bearing part is pressed against the motor case in a pressurized state and thus a moving amount in the radial direction of the rotation member or its moving speed is reduced. Therefore, striking amount or the like to the bearing is reduced and striking noise is restrained. Accordingly, a motor having further excellent calmness can be attained.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3($a$) is an outward appearance perspective view showing an opposite-to-output side bearing which is attached to the motor shown in FIG. 1 and FIG. 3($b$) is its cross section perspective view.

DETAILED DESCRIPTION OF PREFERRED EMBODIMENTS

Embodiments of the present invention will be described in detail below with reference to the accompanying drawings.

Figure 1:
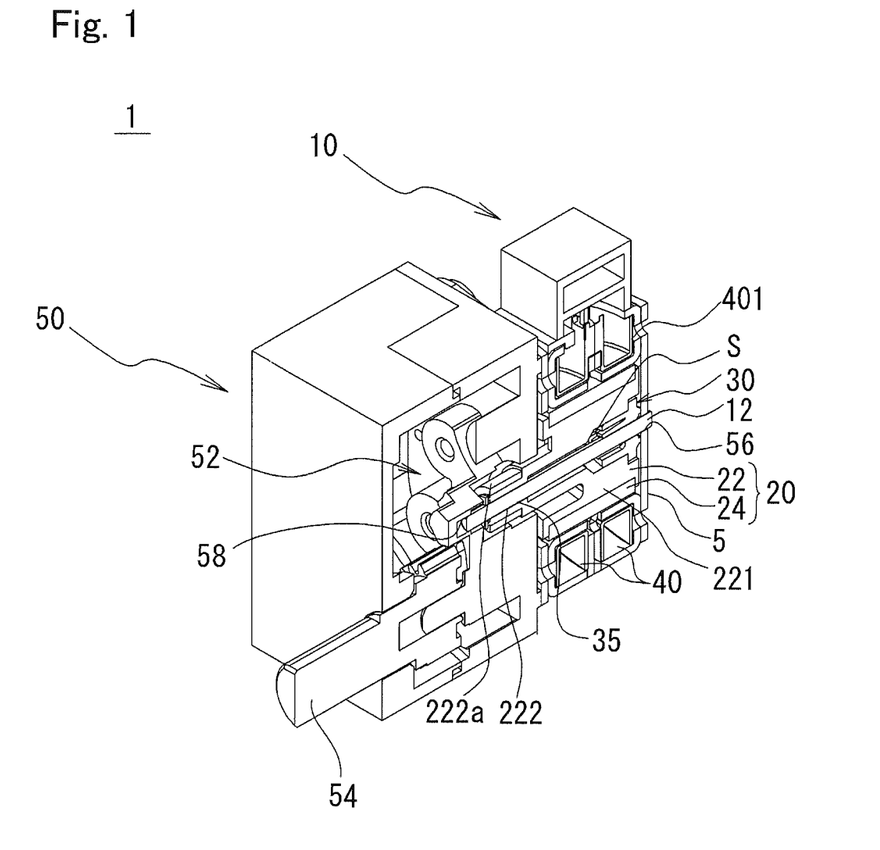
FIG. 1 is a cross sectional perspective view showing a motor in accordance with a first embodiment of the present invention.
Figure 2:
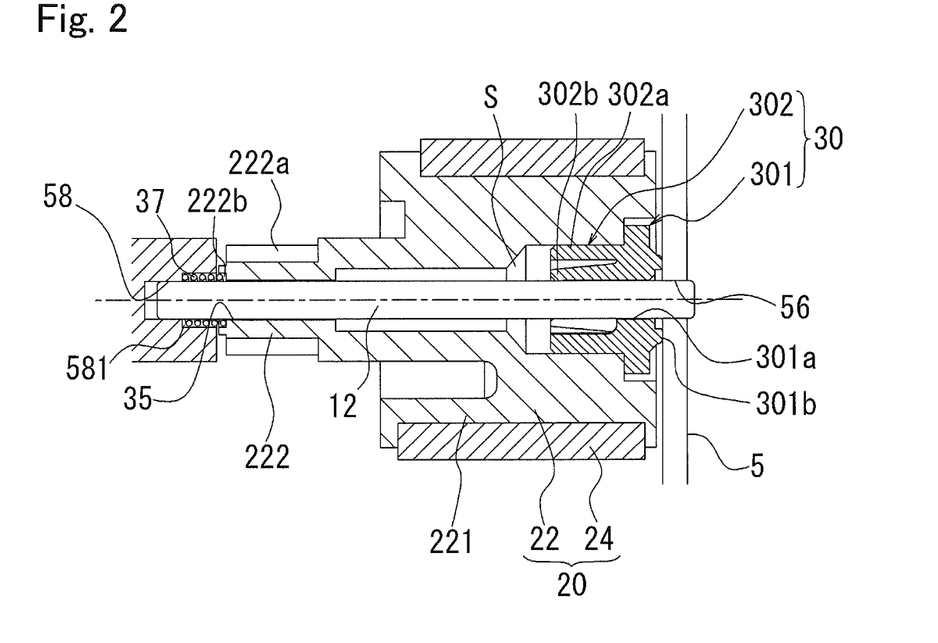
FIG. 2 is an enlarged cross-sectional view showing a motor main body part (drive coil is not included) of the motor shown in FIG. 1.

FIG. 1 is a cross sectional perspective view showing a motor 1 in accordance with a first embodiment of the present invention. FIG. 2 is an enlarged cross-sectional view showing a motor main body part 10 in which a drive coil is not shown.

The motor 1 in this embodiment is a so-called geared motor which is structured of a motor main body part 10 and a gear head 50. Rotation outputted from the motor main body part 10 is transmitted to an output shaft through a gear train within the gear head 50.

The motor main body part 10 is structured so that a support shaft 12, a rotor 20 (which corresponds to a rotation member) which is rotatably supported by the support shaft 12, an opposite-to-output side bearing 30 which is a bearing fixed to the rotor 20, a drive coil 40 which generates a magnetic field for rotating the rotor 20, and the like are accommodated within a motor case 5.

The support shaft 12 is a rod member which is formed so as to have a predetermined diameter and is made of metal (preferably, stainless steel or the like). The support shaft 12 is fixed to the motor case 5 by a first support shaft fixing part 56 and a second support shaft fixing part 58.

The rotor 20 is comprised of a rotor main body 22 made of resin and a drive magnet (permanent magnet) 24 which is fixed to an outer periphery of the rotor main body 22. The rotor 20 is a member which is rotated by a magnetic field that is generated by energization to the drive coil 40.

The rotor main body 22 is structured of a large diameter tube part 221 having a relatively larger diameter and a small diameter tube part 222 having a relatively smaller diameter.

The drive magnet 24 is fixed to an outer peripheral face of the large diameter tube part 221. The drive magnet 24 is disposed so as to face the drive coil 40 through a predetermined gap space. Further, a lubricant filling space "S" in which a lubricant is filled is formed on an inner peripheral face of the large diameter tube part 221 as shown in FIG. 2. Details on operation of the lubricant filling space "S" will be described below. The opposite-to-output side bearing 30 into which the support shaft 12 is inserted is press-fitted and fixed to an opening part of the lubricant filling space "S". In other words, the opposite-to-output side bearing 30 functions as a cover for sealing the lubricant filling space "S" and prevents outflow of a large quantity of the lubricant from the lubricant filling space "S". More specifically, the lubricant which is filled in the lubricant filling space "S" is oozed to a gap between a bearing surface 301$a$ of the first bearing part 301 and the support shaft 12 facing the bearing surface 301$a$ and thus a frictional resistance between the bearing surface 301$a$ of the first bearing part 301 and the support shaft 12 can be reduced.

Figure 3A:
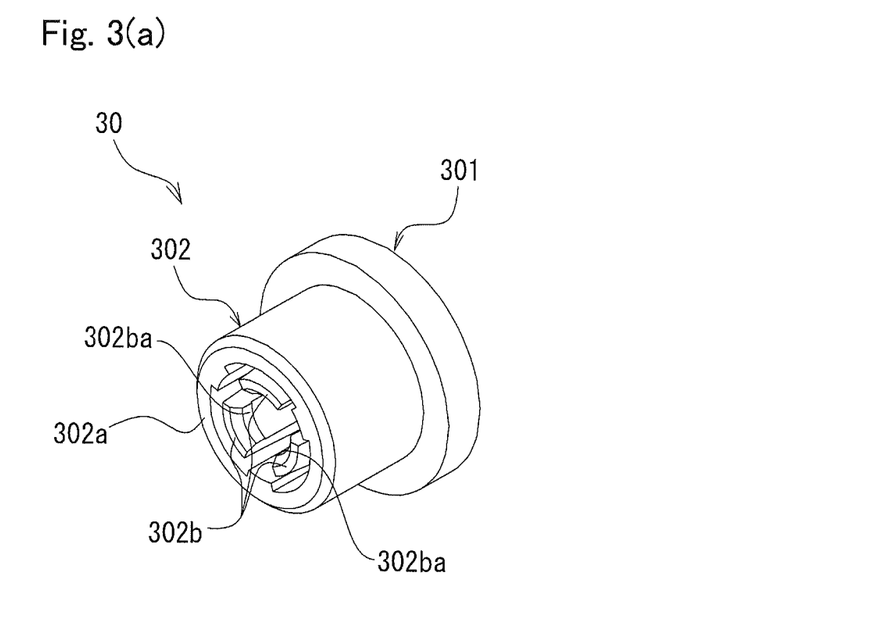
Figure 3B:
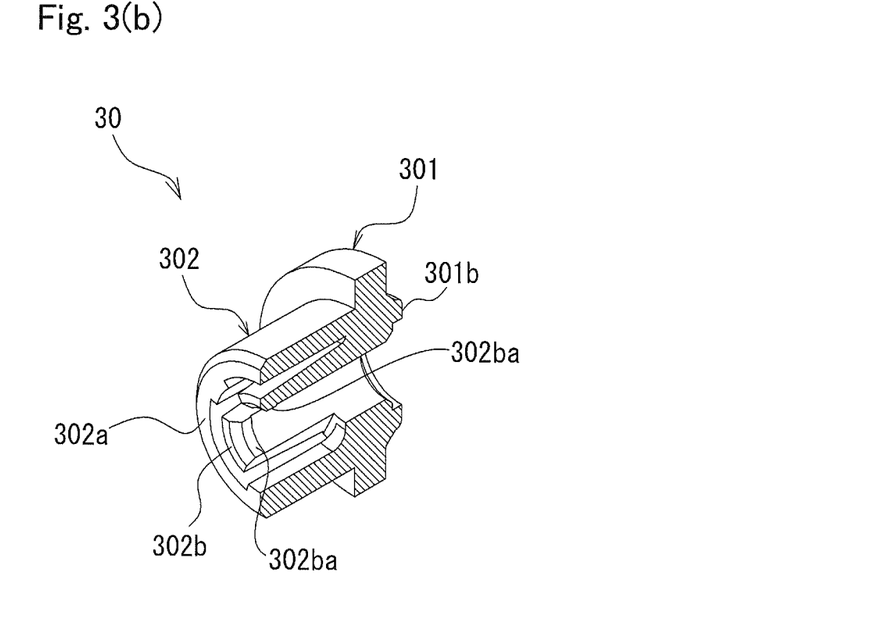

FIG. 3($a$) is an outward appearance perspective view showing the opposite-to-output side bearing 30 and FIG. 3($b$) is its cross section perspective view. The opposite-to-output side bearing 30 is structured of a first bearing part 301 for sealing the lubricant filling space "S" and a second bearing part 302.

The first bearing part 301 is a radial bearing which is made of resin (preferable material is polyoxymethylene (POM) and the like) and is formed in a cylindrical shape. The support shaft 12 is inserted into the bearing hole 301$a$ of the first bearing part 301 so that one end of the rotor 20 is rotatably supported. Therefore, in this embodiment, when the motor 1 is driven (at the time rotation of the rotor 20), the shaft made of metal (stainless steel) and the bearing made of resin are slid with each other and thus a frictional resistance occurred between the shaft and the bearing can be made smaller.

Further, one end face of the first bearing part 301 (end face on the opposite-to-output side of the motor 1) is formed with a ring-shaped protruded part 301$b$. The protruded part 301$b$ is abutted with the motor case 5.

The second bearing part 302 is a portion which is integrally formed with the first bearing part 301 as one body. The second bearing part 302 is structured of a cylindrical tube part 302$a$, which is formed so as to protrude from an opposite face (end face on the output side of the motor 1) to the end face where the protruded part 301$b$ of the first bearing part 301 is formed, and urging parts 302$b$ which are formed so as to protrude from the same opposite face.

The urging parts 302$b$ are formed at an equal interval on a circumference in a predetermined dimension. In this embodiment, as shown in FIG. 3($a$), the urging parts 302$b$ are formed so as to be divided into three portions in the circumferential direction of the support shaft 12. Further, tip end parts of the respective urging parts 302$b$ are formed with an abutting part 302$ba$ which is abutted with the outer peripheral face of the support shaft 12. In addition, inner peripheral faces of the urging parts 302$b$ except the abutting parts 302$ba$ are not abutted with the first bearing part 301 so as to provide a gap space. As described above, when the support shaft 12 is inserted into the first bearing part 301, the support shaft 12 is urged in a center direction of the first bearing part 301 (center direction of the rotor 20) by the urging parts 302$b$. Further, the urging position in the axial direction where the abutting parts 302$ba$ are abutted with the support shaft 12 is designed on the basis of a thickness or material of the urging part 302$b$ so that the urging part 302$b$ is provided with an urging force that is required to suppress rattling between the support shaft 12 and the inner peripheral face of the bearing hole 301$a$. In addition, when the motor is driven, similarly to other bearing parts, the urging parts 302$b$ are also expanded and thus the urging force for urging the support shaft 12 is decreased but, also in this case, the urging parts 302$b$ are capable of providing advantage obtained by the present invention. In other words, when the motor is driven, since the support shaft 12 is urged in the center direction of the rotor 20 by the urging parts 302b, occurrence of a striking noise due to rattling between the rotor 20 (bearing) and the support shaft 12 is prevented. In addition, in a case that the urging position where the abutting part 302ba is abutted with the support shaft 12 is set at the same position as the center position or its vicinity of the drive magnet 24, the urging force urged by the abutting part 302ba against the support shaft 12 can be made smaller and rattling is efficiently suppressed. Further, the abutting parts 302ba which are divided into three pieces are abutted with and hold the outer periphery of the support shaft 12 at substantially equal interval positions. Therefore, an external force applied from every direction in the radial direction of the support shaft 12 is supported by the abutting parts 302ba. Accordingly, rattling can be prevented.

In this embodiment, when the motor 1 is driven, frictional heat is generated by sliding of the support shaft 12 with the first bearing part 301. In this case, the first bearing part 301 is thermally expanded and the bearing hole 301a becomes larger and, as a result, the inner peripheral face of the bearing hole may be hit against the support shaft to occur a so-called "striking noise".

On the other hand, in the motor 1 in accordance with this embodiment, the urging parts 302b of the first bearing part 301 always urge the support shaft 12 in the center direction of the rotor 20 and thus the "striking noise" is reduced.

Further, the rotor 20 is urged in the opposite-to-output side direction by a coil spring 37 as a spring member. The coil spring 37 is held between a first spring holding part 222b, which is recessed from an end part of the small diameter tube part 222, and a second spring holding part 581 which is recessed from an end part of the second support shaft fixing part 58. As shown in FIG. 2, the opposite-to-output side end face of the first bearing part 301 is formed with the ring-shaped protruded part 301b as described above. Therefore, when the motor 1 is driven, the rotor 20 is rotated while the protruded part 301b and the motor case 5 are slid with each other. As described above, in this embodiment, the striking noise is prevented by a frictional force occurred between the protruded part 301b and the motor case 5 as well. In other words, the protruded part 301b is applied with a pressure by the urging force of the coil spring 37 to be pressed against a wall face of the motor case 5. Therefore, when the protruded part 301b slides on the wall face of the motor case 5, friction occurs to some extent and thus a moving amount in the radial direction of the rotor 20 is reduced and a moving speed is also reduced. Therefore, the striking amount, the striking speed and the like of the bearing are reduced and the striking noise is suppressed. Accordingly, a motor having further excellent calmness can be attained. In this embodiment, the lubricant filled in the lubricant filling space "S" is oozed to a gap space between the bearing surface 301a of the first bearing part 301 and the support shaft 12 which faces the bearing surface 301a. In addition, the lubricant oozed from the gap space between the bearing surface 301a and the support shaft 12 may be reached to the wall face of the motor case 5 and the protruded part 301b and, in this manner, the frictional resistance between the wall face of the motor case 5 and the protruded part 301b is reduced to some extent. Further, in this embodiment, the coil spring 37 is used as the spring member but the present invention is not limited to this embodiment. For example, a spring member such as a flat spring may be used.

On the other hand, an outer peripheral face of the small diameter tube part 222 of the rotor 20 is formed with an output gear 222a. Further, an inner peripheral face of the small diameter tube part 222 is formed with a third bearing part 35.

The support shaft 12 is inserted into the third bearing part 35. In other words, one end (opposite-to-output side) of the rotor 20 is supported by the support shaft 12 through the opposite-to-output side bearing 30, which is structured of the first bearing part 301 and the second bearing part 302, and the other end (output side) of the rotor 20 is supported by the support shaft 12 through the third bearing part 35. In addition, in this embodiment, the lubricant which is filled in the lubricant filling space "S" is oozed to a gap space between the bearing surface of the third bearing part 35 and the support shaft 12 facing the bearing surface and thus, similarly to the first bearing part 301, the frictional resistance between the bearing surface of the third bearing part 35 and the support shaft 12 is reduced.

The drive coil 40 is a member which is structured so that an electric wire is wound around two coil bobbins 401 by a predetermined number of times. In this embodiment, two coil bobbins 401 are fixed to the motor case 5 and disposed so as to superpose on each other in the axial direction of the support shaft 12. When an electric power is supplied to the drive coil 40, a magnetic field for rotating the rotor 20 is generated.

An output side of the motor main body part 10 is attached with the gear head 50 in which a reduction gear train 52 comprised of a plurality of gears is disposed. Rotary power outputted from the motor main body part 10 is decelerated by the reduction gears and transmitted to the output shaft 54 as an output of the motor 1.

Next, operation of the lubricant filling space "S" which is formed in the motor 1 (rotor 20) structured as described above will be described below.

As described above, in the motor 1 in accordance with this embodiment, the striking noise is prevented by means of that the support shaft 12 is urged in the center direction of the rotor 20 by the urging parts 302b formed in the second bearing part 302. In addition, in this embodiment, when the motor 1 is driven, vibration of the support shaft 12 is prevented by viscosity of the lubricant which is filled in the lubricant filling space "S" formed in the rotor 20 and thus the striking noise is further reduced.

Further, when the motor 1 is driven, the rotor 20 is rotated while the support shaft 12 is urged by the urging parts 302b and thus frictional heat due to sliding is easily generated between the urging parts 302b and the support shaft 12. When frictional heat is generated, the opposite-to-output side bearing 30 is expanded to cause the bearing hole 301a of the first bearing part 301, into which the support shaft 12 is inserted, to be larger. For example, when the opposite-to-output side bearing 30 is formed of polyoxymethylene (POM) and a hole diameter of the bearing hole 301a is φ 1.6 mm, a clearance between the support shaft 12 and the bearing hole 301a is 0.0250 mm under a standard state (20 degrees) but, at the time of motor driving (90 degrees), the clearance becomes to be 0.0362 mm, which is about 1.5 times. Therefore, temperature rising of the opposite-to-output side bearing is required to restrain as much as possible.

In this embodiment, since the sliding portion is located within the lubricant filling space "S", the frictional resistance is reduced remarkably and generation of the frictional heat is restrained. Therefore, abrasion of the urging parts 302b and the support shaft 12 are restrained and a longer service life time of the motor 1 can be attained. In addition, the coefficient of thermal conductivity of a lubricant such as grease or lubricating oil is commonly larger than that of air and thus heat radiation of the frictional heat generated by sliding can be performed smoothly.

In addition, the lubricant which is filled in the lubricant filling space "S" is oozed to the sliding face between the first bearing part 301 and the third bearing part 35 and the support shaft 12. Therefore, the frictional resistance between the first bearing part 301 and the third bearing part 35 and the support shaft 12 is reduced. Further, since the lubricant is always supplied to the sliding face, deterioration occurred by evaporation or the like of the lubricant in the sliding face and occurrence of torque loss are also prevented. Especially, like the motor 1 in this embodiment, in a case of the motor where rotary power outputted from the motor main body part 10 is decelerated and outputted through reduction gears, the rotational speed of the rotor 20 is higher and the frictional force occurred between the first bearing part 301 and the third bearing part 35 and the support shaft 12 is larger and thus the present invention is more effective.

The lubricant which is filled in the lubricant filling space "S" performs various operations as described above. Therefore, the lubricant which is filled in the lubricant filling space "S" is selected depending on characteristics, operating environment and the like of the motor 1. For example, SUMITEC (registered trademark) L39S made by SUMIKOU JUNKAT-SUZAI KK and the like whose evaporation amount under a high temperature condition is small and dropping point is 200 degrees or higher may be preferably used as the lubricant (grease).

Figure 4:
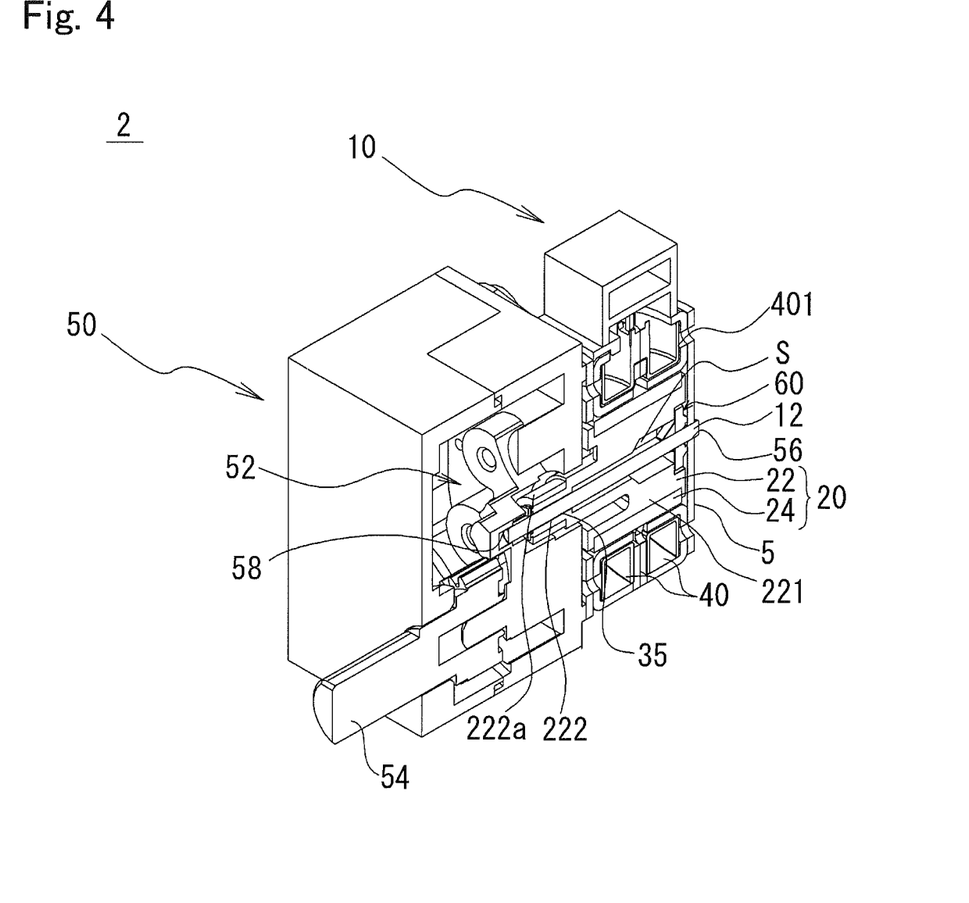
FIG. 4 is a cross sectional perspective view showing a motor in accordance with a second embodiment of the present invention.

Next, a second embodiment of the present invention will be described below. FIG. 4 is a cross sectional perspective view showing a motor 2 in accordance with the second embodiment.

The motor 2 is different from the motor 1 in accordance with the first embodiment only in the structure of the opposite-to-output side bearing 60. Other members are structured similarly to the first embodiment and thus the same notational symbols are used and their descriptions are omitted.

Figure 5:
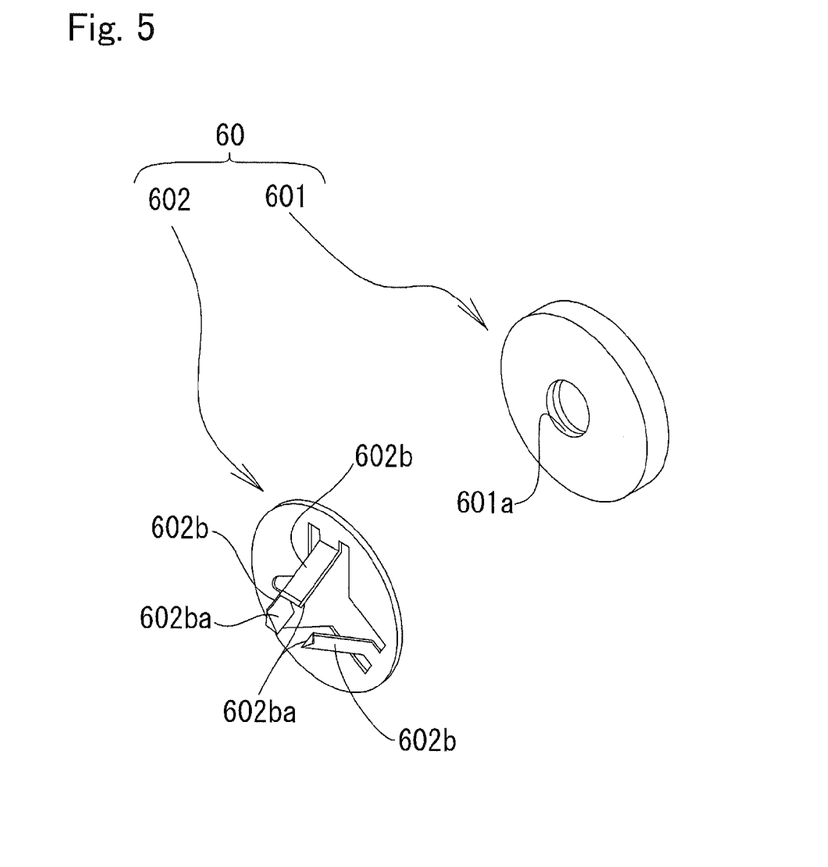
FIG. 5 is an outward appearance perspective view showing a first bearing and a second bearing which structure an opposite-to-output side bearing of the motor shown in FIG. 4.

An opposite-to-output side bearing 60 is structured of a first bearing part 601 and a second bearing part 602. Their outward appearance perspective views are shown in FIG. 5.

The first bearing part 601 is a radial bearing formed in a cylindrical shape and its center is formed with a bearing hole 601*a* into which the support shaft 12 is inserted. Further, similarly to the first embodiment, the first bearing part 601 is made of resin such as polyoxymethylene (POM) and the like for reducing frictional resistance occurred between the support shaft 12 made of metal and the first bearing part 601.

The second bearing part 602 is a press-worked product made of a metal plate in which three urging parts 602*b* are formed at an equal interval. The second bearing part 602 is mounted so as to be sandwiched between an opening part of the lubricant filling space "S" formed in the rotor 20 and the first bearing part 601. In addition, inner peripheries except abutting parts 602*ba* of the urging parts 602*b* are not abutted with the support shaft 12 and thus a space is provided. The support shaft 12 is urged in the center direction of the rotor 20 by the urging parts 602*b* of the second bearing part 602. In this manner, a striking noise occurred between the support shaft 12 and the first bearing part 601 is reduced.

Further, the second bearing part 602 is mounted in the lubricant filling space "S" which is filled with a lubricant and thus, similarly to the first embodiment, a frictional resistance between the urging parts 602*b* (abutting parts 602*ba*) and the support shaft 12 is reduced by the lubricant. Further, a heat radiation effect for frictional heat is enhanced by the lubricant whose heat conductivity is superior to air. In addition, the frictional resistance between the first bearing part 301 and the third bearing part 35 and the support shaft 12 is reduced by the oozed lubricant.

As described above, like the motor 2 in accordance with the second embodiment of the present invention, even when the opposite-to-output side bearing 60 is structured of two members, i.e., the first bearing part 601 which is a radial bearing for supporting the support shaft 12 and the second bearing part 602 for urging the support shaft 12 in the center direction of the rotor 20, similar effects to the first embodiment are obtained.

As described above, according to the motor 1 (2) in accordance with the embodiment of the present invention, the support shaft 12 is urged in the center direction of the rotor 20 by the urging parts 302*b* (602*b*) of the second bearing part 302 (second bearing part 602) of the opposite-to-output side bearing 30 (60) provided in the rotor (rotation member) 20. Therefore, occurrence of a striking noise due to rattling between the bearing hole 301*a* (601*a*) of the first bearing part 301 (first bearing part 601) and the support shaft 12 is prevented.

In this case, the rotor 20 is rotated while the second bearing part 302 (second bearing part 602) urges the support shaft 12 and thus frictional heat is easily generated between the second bearing part 302 (second bearing part 602) and the support shaft 12. However, the second bearing part 302 (second bearing part 602) is disposed in the lubricant filling space "S" which is formed by the rotor 20 and the first bearing part 301 (first bearing part 601) and thus generation of the frictional heat is reduced.

Further, the lubricant which is filled in the lubricant filling space "S" is oozed to the sliding face between the first bearing part 301 (first bearing part 601) and the third bearing part 35, which are provided in the rotor 20, and the support shaft 12 and thus the frictional resistance between the bearings and the support shaft 12 is reduced.

In addition, three urging parts 302*b* (602*b*) disposed at an equal interval are provided in the second bearing part 302 (second bearing part 602) and thus the support shaft 12 is surely urged in the center direction against the stress in the radial direction occurred in the support shaft 12.

Further, the motor 1 (2) in accordance with the present embodiment is a motor in which rotary power outputted from the motor main body part 10 is decelerated and outputted through reduction gears and the rotational speed of the rotor 20 is higher. In other words, the motor 1 (2) is a motor in which a frictional force between the first bearing part 301 (first bearing part 601) and the third bearing part 35 and the support shaft 12 is larger (amount of heat generation due to friction is larger). However, the frictional heat generated in the support shaft 12, the abrasion of the support shaft 12 and the like are effectively restrained by the lubricant which is filled in the lubricant filling space "S".

In addition, in the motor 1, the support shaft 12 made of metal and the opposite-to-output side bearing 30 made of resin are slid with each other and thus the frictional resistance between the support shaft 12 and the opposite-to-output side bearing 30 is reduced largely. Further, the first bearing part 301 and the second bearing part 302 which structure the opposite-to-output side bearing 30 are formed integrally as one body and thus the number of part items is decreased and component manufacturing cost and assembling cost are reduced.

Although the present invention has been shown and described with reference to a specific embodiment, various changes and modifications will be apparent to those skilled in the art from the teachings herein.

For example, the embodiment described above is a so-called geared motor in which rotary power outputted from the motor main body part 10 is decelerated and outputted through reduction gears. However, the present invention is not limited to the geared motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A motor comprising:
a rotation member;
a bearing which is fixed to the rotation member; and
a support shaft by which the rotation member is rotatably supported through the bearing;
wherein the bearing is structured of a first bearing part, which rotatably supports the rotation member with respect to the support shaft, and a second bearing part which rotatably supports the rotation member with respect to the support shaft by an urging part that is urged on a rotation center side;
wherein a first end part of the rotation member is formed with a third bearing part which rotatably supports the rotation member with respect to the support shaft; and
wherein the first bearing part is provided at a second end part of the rotation member, a lubricant filling space which is filled with a lubricant is formed between the first bearing part and the third bearing part, and the second bearing part is disposed within the lubricant filling space;
wherein the urging parts comprise three urging parts provided in a circumferential direction of support shaft,
an abutting part which is abutted with an outer peripheral face of the support shaft is formed at a tip end part of each of the three urging parts, and
the abutting parts are abutted with the outer peripheral face of the support shaft at a substantially equal interval for holding the support shaft.

2. The motor according to claim 1, wherein
the urging part comprises three or more urging parts provided at positions in a circumferential direction of the support shaft, and
the urging parts are disposed so that all angles between adjacent urging parts around the support shaft are set to be less than 180 degrees.

3. The motor according to claim 1, wherein the support shaft is a rotor shaft for the motor.

4. The motor according to claim 1, wherein
the support shaft is formed of metal, and
the first bearing part and the second bearing part are made of resin and are integrally structured as one body.

5. A motor comprising:
a rotation member;
a bearing which is fixed to the rotation member; and
a support shaft by which the rotation member is rotatably supported through the bearing;
wherein the bearing is structured of a first bearing part, which rotatably supports the rotation member with respect to the support shaft, and a second bearing part which rotatably supports the rotation member with respect to the support shaft by an urging part that is urged on a rotation center side;
wherein a first end part of the rotation member is formed with a third bearing part which rotatably supports the rotation member with respect to the support shall; and
wherein the first bearing part is provided at a second end part of the rotation member, a lubricant fining space which is filled with a lubricant is formed between the first bearing part and the third bearing part, and the second bearing part is disposed within the lubricant filling space;
wherein a protruded part which is abutted with a motor case is formed at an end face of the first bearing part, and
the rotation member is urged toward the motor case in an axial direction of the support shaft by a spring member.

6. The motor according to claim 1, wherein
the support shaft is fixed to a motor case,
the rotation member is a rotor which is rotatably supported by the support shaft,
the rotor is provided with a large diameter tube part having a relatively large diameter and a small diameter tube part having a relatively small diameter,
the lubricant filling space is formed on an inner peripheral face of the large diameter tube part,
an opening part of the lubricant filling space is sealed by the first bearing part, and
the second bearing part is disposed on a lubricant filling space side with respect to the first bearing part and a sliding portion of the urging part of the second bearing part with the support shaft is located within the lubricant filling space.

7. The motor according to claim 6, wherein
the support shaft is made of metal,
the first bearing part is made of resin,
the small diameter tube part structuring the rotor is structured of resin and the third bearing part formed on an inner peripheral face of the small diameter tube part is made of resin, and the lubricant which is filled in the lubricant filling space is oozed to a gap space between a bearing surface of the first bearing part and the support shaft and is oozed to a gap space between a bearing surface of the third bearing part and the support shaft.

8. A motor comprising:
a rotation member;
a bearing which is fixed to the rotation member; and
a support shaft by which the rotation member is rotatably supported through the bearing;
wherein the bearing is structured of a first bearing part, which rotatably supports the rotation member with respect to the support shaft, and a second bearing part which rotatably supports the rotation member with respect to the support shaft by an urging part that is urged on a rotation center side;
wherein a first end part of the rotation member is formed with a third bearing part which rotatably supports the rotation member with respect to the support shaft; and
wherein the first bearing part is provided at a second end part of the rotation member, a lubricant filling space which is filled with a lubricant is formed between the first bearing part and the third bearing part, and the second bearing part is disposed within the lubricant filling space;
wherein the support shaft is fixed to a motor case,
the rotation member is a rotor which is rotatably supported by the support shaft,
the rotor is provided with a large diameter tube part having a relatively large diameter and a small diameter tube part having a relatively small diameter, the lubricant filling space is formed on an inner peripheral face of the large diameter tube part, an opening part of the lubricant filling space is sealed by the first bearing part, and the second bearing part is disposed on a lubricant fitting space side with respect to the first bearing part and a sliding portion of the urging part of the second bearing part with the support shaft is located within the lubricant filling space;

wherein the urging part comprises a plurality of urging parts provided in a circumferential direction of the support shaft, an abutting part which is abutted with an outer peripheral face of the support shaft is formed at a tip end part of each of the plural urging parts, and respective abutting parts are abutted with an outer peripheral face of the support shaft at a substantially equal interval for holding the support shaft.

9. The motor according to claim 8, wherein
the support shaft is made of metal, and
the first bearing part and the second bearing part are made of resin and structured as one body.

10. The motor according to claim 8, further comprising:
a protruded part which is formed on an end face of the first bearing part and which is capable of abutting with the motor case, and
a spring member which urges the rotor from a small diameter tube part side,
wherein the rotor is rotated while the protruded part and the motor case are slid with each other.

* * * * *